US007051220B2

(12) United States Patent
Geiger et al.

(10) Patent No.: US 7,051,220 B2
(45) Date of Patent: May 23, 2006

(54) MECHANISM FOR REDUCING POWER CONSUMPTION OF A TRANSMITTER/RECEIVER CIRCUIT

(75) Inventors: Avi R. Geiger, Seattle, WA (US); Glenn M. Davis, Woodinville, WA (US); Anton W. Krantz, Kirland, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 10/376,413

(22) Filed: Feb. 28, 2003

(65) Prior Publication Data

US 2004/0172566 A1    Sep. 2, 2004

(51) Int. Cl.
G06F 1/32 (2006.01)
G06F 1/26 (2006.01)

(52) U.S. Cl. .................................. 713/320; 713/300
(58) Field of Classification Search ................ 713/300, 713/320
See application file for complete search history.

(56) References Cited

U.S. PATENT DOCUMENTS

| 6,072,809 | A  | * | 6/2000 | Agrawal et al. ............. 370/503 |
| 6,236,674 | B1 | * | 5/2001 | Morelli et al. .............. 375/219 |
| 6,618,580 | B1 | * | 9/2003 | Parrott et al. .............. 340/7.33 |
| 6,766,309 | B1 | * | 7/2004 | Cheng et al. .................. 706/3 |

* cited by examiner

Primary Examiner—Lynne H. Browne
Assistant Examiner—Stefan Stoynov
(74) Attorney, Agent, or Firm—Workman Nydegger (57) ABSTRACT

A mechanism that reduces power consumption of a transmitter/receiver circuit in a wireless device. The transmitter/receiver circuit is powered down to a reduced-power state after transmitting a message. The reduced-power state is too low to be able to transmit or receive information. Round trip statistics regarding how low it typically takes to receive a response to the message are then used to determine when to power up the transmitter/receiver circuit to the extent that it could receive the response. Accordingly, by being powered up for only a window of time in which the receipt of the response would likely occur, the transmitter/receiver circuit consumes less power while still likely receiving the response. The window of time may be adjusted as appropriate for the importance of the information, the performance of the specific wireless network, and the sensitivity of the wireless network to not receiving the response.

32 Claims, 5 Drawing Sheets

MECHANISM FOR REDUCING POWER CONSUMPTION OF A TRANSMITTER/RECEIVER CIRCUIT

BACKGROUND OF THE INVENTION

1. The Field of the Invention

The present invention relates to power conservation technology, and more specifically, to mechanisms that reduce the power consumption of the transmitter/receiver circuit when communicating information over a wireless network.

2. Background and Related Art

Computers now come in a wide variety of forms including even portable devices such as laptop computers, tablet PCs, Personal Digital Assistants (PDAs), and even mobile telephones. In order to facilitate mobility, such portable devices have some differences as compared to desktop computers. Specifically, in order to allow for greater convenience and mobile access to information, portable devices are often connected to a wireless network as opposed to having a hardwired network connection. In addition, it is often impossible (or at least inconvenient) to plug in portable devices to a fixed electrical connection such as a wall plug since such a fixed power connection would limit the location of the portable device to a specific area. Accordingly, to facilitate portability, such portable devices often work on battery power even though they are also capable of being connected to a fixed power source.

The faster power is consumed, the more often the user of the portable device has to go through the inconvenience of recharging and/or replacing the battery. In some cases, a replacement battery or recharging source may not be available when the battery runs out leaving the user without the use of the portable device whatsoever. Accordingly, reduced power consumption (or at least the option to reduce power consumption) is particularly advantageous in such portable devices.

A major consumer of power in portable devices that are connected with a wireless network is the transmitter/receiver circuit that is responsible for transmitting over and receiving from the wireless network. Accordingly, what would be advantageous are methods and computer program products that reduce the power consumption of the transmitter/receiver circuit.

BRIEF SUMMARY OF THE INVENTION

The foregoing problems with the prior state of the art are overcome by the principles of the present invention, in which the transmitter/receiver circuit enters a reduced-power mode for at least some of the time between the time that a message is transmitted and the time that a response to the message is returned.

Each wireless network has its own performance metrics in terms of when a response to a message may be received. The message may be, for example, a packet in a packet-based network such as an 802.11b network that supports TCP/IP, in which case the response may be a TCP acknowledgement messages.

The transmitter/receiver circuit is turned on when transmitting a message. Then, the transmitter/receiver is placed in a reduced-power mode in which the transmitter/receiver circuit is not prepared to transmit or receive any information. The portable device then identifies a time before which a response to the message would most likely not be delivered. This identified time may be inferred based on previous statistical monitoring of round trip times of the specific wireless network to which the portable device is connected. If the response to the message is not scheduled in a deterministic way, the identified time may not be derived based on a scheduled time for the response. Instead, the time for receiving the response is not known for certain, and thus the identified time is based on statistical data. The receiver is then turned on at about the identified time so that the response to the message may likely be received in a relatively short amount of time. In one embodiment, the portable device also identifies a time before which the response is likely to be received. The transmitter/receiver circuit may turn on and remain on for a window of time extending from the identified time after which the response is likely to be received, and the identified time before which the response is likely to be received.

This process may be repeated for multiple wireless networks since the portable device may, at some point in time, be connected to a variety of different wireless networks with different performance characteristics. In addition, the extent of the window of time during which the transmitter/receiver is prepared to receive the response may be adjusted in accordance with the importance of the data and/or the sensitivity of the wireless network to not receiving an expected response.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms that reduce power consumption of a transmitter/receiver circuit in a wireless device. The transmitter/receiver circuit is powered down to a reduced-power state after transmitting a message. The reduced-power state is too low to be able to transmit or receive information. Round trip statistics regarding how long it typically takes to receive a response to the message are then used to determine when to power up the transmitter/receiver circuit to an increased-power state that would allow the transmitter/receiver circuit to receive the response. Accordingly, by being powered up for only a window of time in which the receipt of the response would likely occur, the transmitter/receiver circuit consumes less power. The window of time may be adjusted as appropriate for the importance of the information and the performance of the specific wireless network.

The embodiments of the present invention may include a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Figure 1:
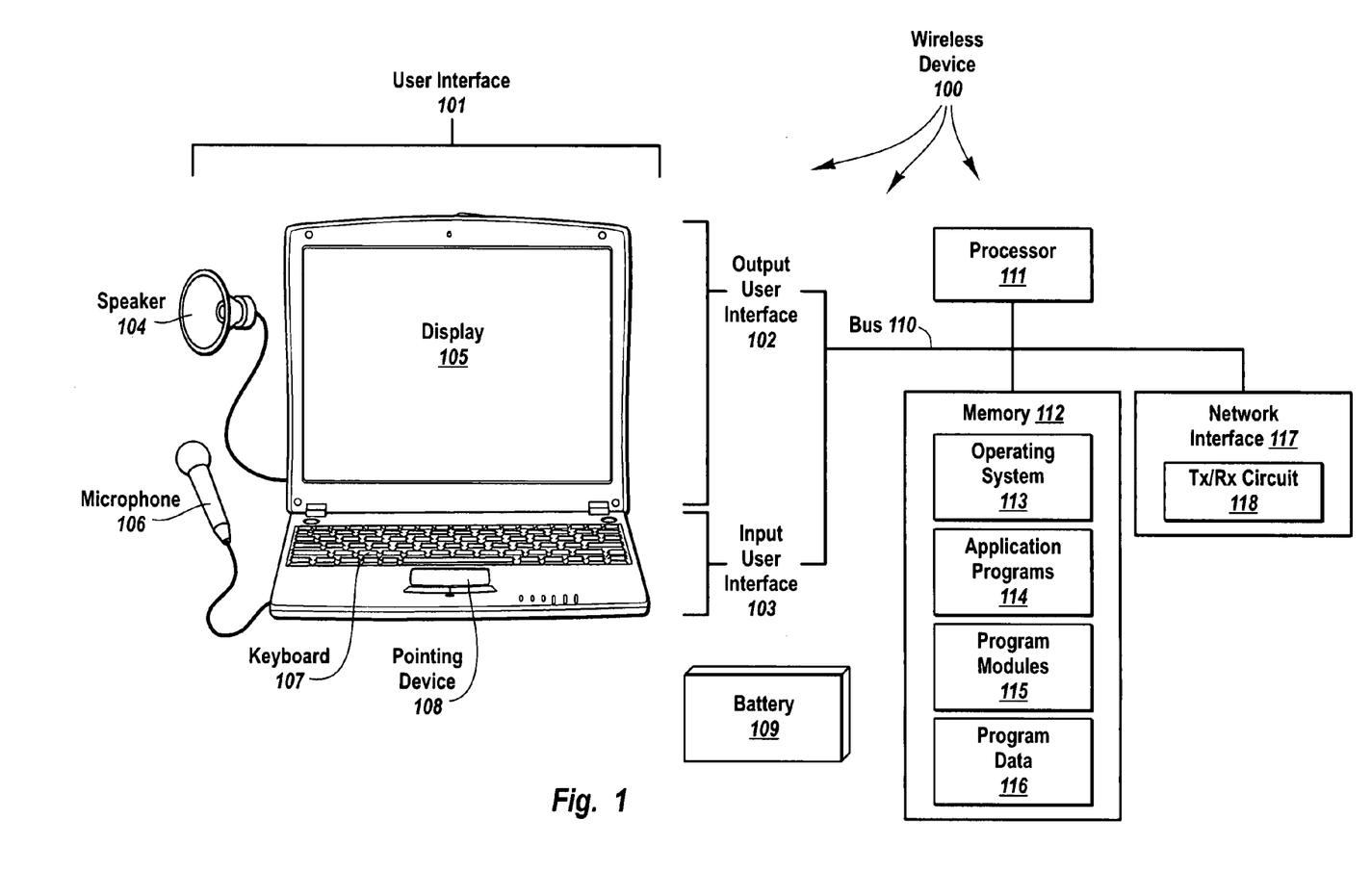
FIG. 1 illustrates a suitable wireless device that may implement the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types.

With reference to FIG. 1, a suitable operating environment for the principles of the invention includes a general purpose computing device in the form of a wireless device 100. Although the wireless device 100 has the appearance of a laptop computer, a wide-variety of devices are now capable of communicating over a wireless network and may benefit by employing the principles of the present invention. For example, tablet PCs, Personal Digital Assistants (PDAs), telephones and other wireless devices are now available. In addition, other wireless device forms may be developed in the future. The principles of the present invention are not limited to the particular form of the wireless device, whether already developed or whether it is yet to be developed.

The wireless device 100 includes a user interface 101 for allowing a user to input information through an input user interface 103. The user reviews information presented via an output user interface 102. The user interface will vary widely depending on the form factor of the wireless device. In the illustrated embodiment, however, in which the wireless device 100 is a laptop computer, the output user interface 102 includes a speaker 104 for presenting audio information to the user, as well as a display 105 for presenting visual information to the user.

The input user interface 103 may include a microphone 106 for rendering audio information into electronic form. In addition, the input user interface 103 includes keyboard 107 and pointing device 108 that allow the user to input information into the wireless device 100. Although the speaker 104 and the microphone 106 are illustrated as external, the speaker and microphone would typically be integrated with and/or internal to the wireless device 100.

When the wireless device 100 is disconnected from an external power source, the wireless device is supplied power from a battery 109. Though battery technology is improving somewhat, it is still advantageous to increase the lifetime for a given battery. The principles of the present invention allow an increase in battery lifetime by more advanced power management of the transmitter/receiver circuit responsible for physically sending and receiving information over the wireless network.

Program code means comprising one or more program modules may be stored in a memory 112. The one of more program modules may include an operating system 113, one or more application programs 114, other program modules 115, and program data 116. The one or more program modules may be instantiated in the memory (if volatile), or loaded from memory (if non-volatile) and then further processed using a processor 111. The program code means may include non-volatile as well as volatile memory and its form may vary greatly depending on the type of wireless device.

A network interface 117 manages communication over the wireless network and may include and/or interface with a transmitter/receiver circuit 118 that physically sends and receives signals over the wireless network. A system bus 110 allows for efficient communication between the user interface 101, the processor 111, the memory 112, and the network interface 117.

While FIG. 1 represents a suitable operating environment for the present invention, the principles of the present invention may be employed in any wireless device that is capable of communicating over a wireless network. The wireless device illustrated in FIG. 1 is illustrative only, and by no means represents even a small portion of the wide variety of environments in which the principles of the present invention may be implemented.

Figure 2:
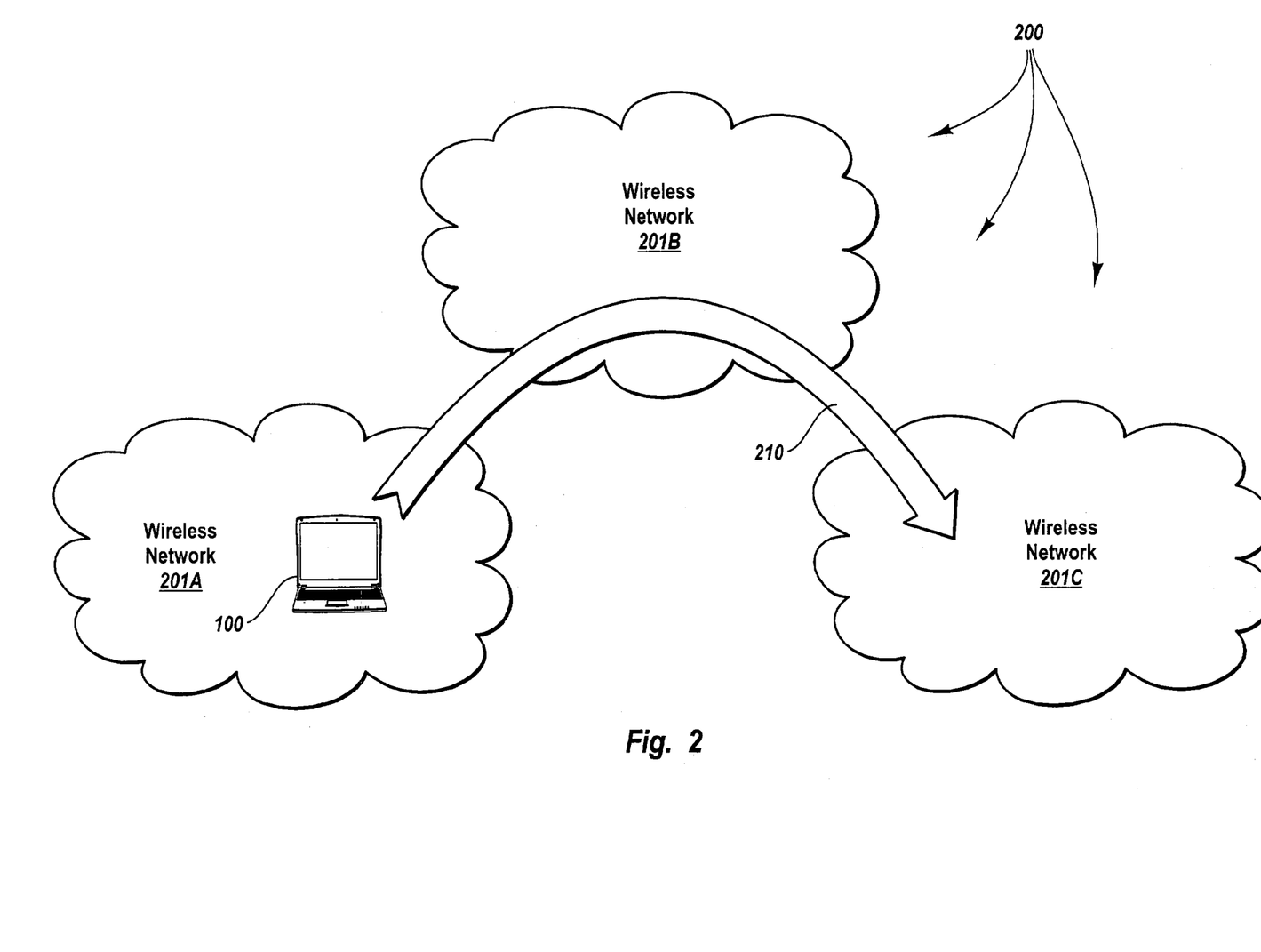
FIG. 2 illustrates a network environment in which the principles of the present invention may be employed.

FIG. 2 illustrates an environment 200 in which the wireless device 100 is situated within the wireless network 201A. An arrow 210 illustrates the wireless device 100 travel from one wireless network to another. For instance, arrow 210 shows that the wireless device 100 may travel from wireless network 201A, to wireless network 201B, to wireless network 201C. The wireless networks may be any wireless network including, for example, an 802.11 wireless network (including 802.11a/b/g and other PHY layer variants), a Bluetooth wireless network, or a wireless carrier network or a cell therein.

Figure 3A:
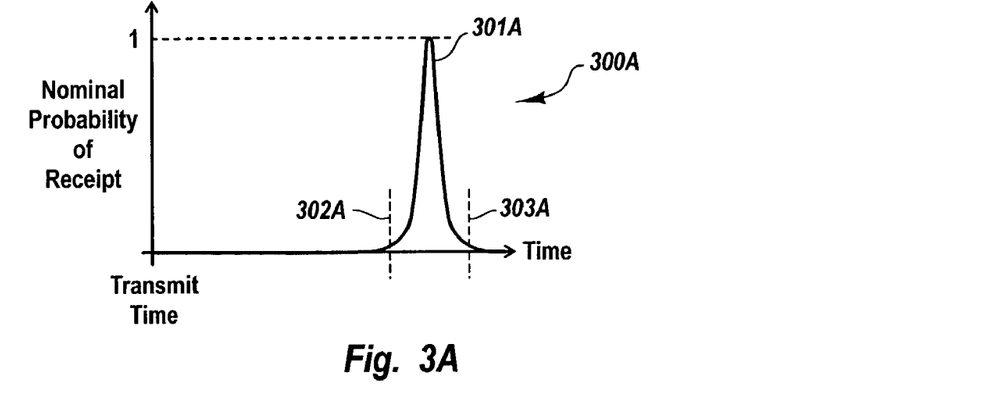
FIG. 3A through 3C illustrate various round trip performance statistics for different networks.
Figure 3B:
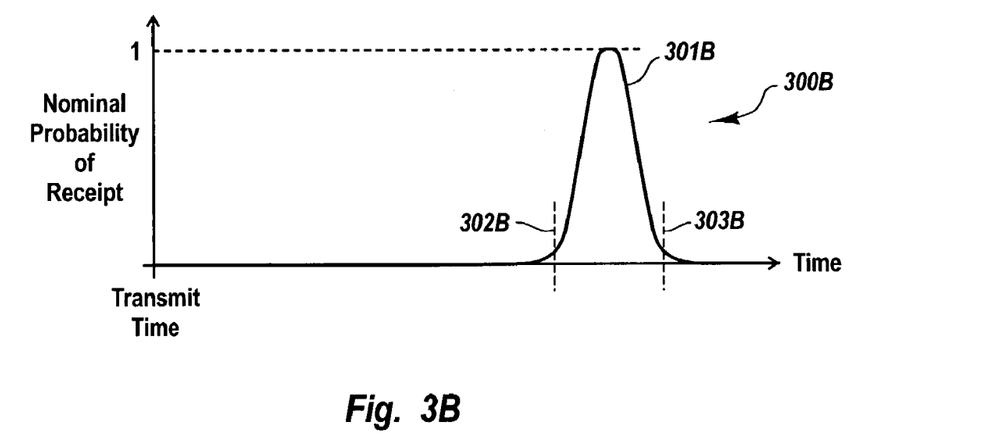
Figure 3C:
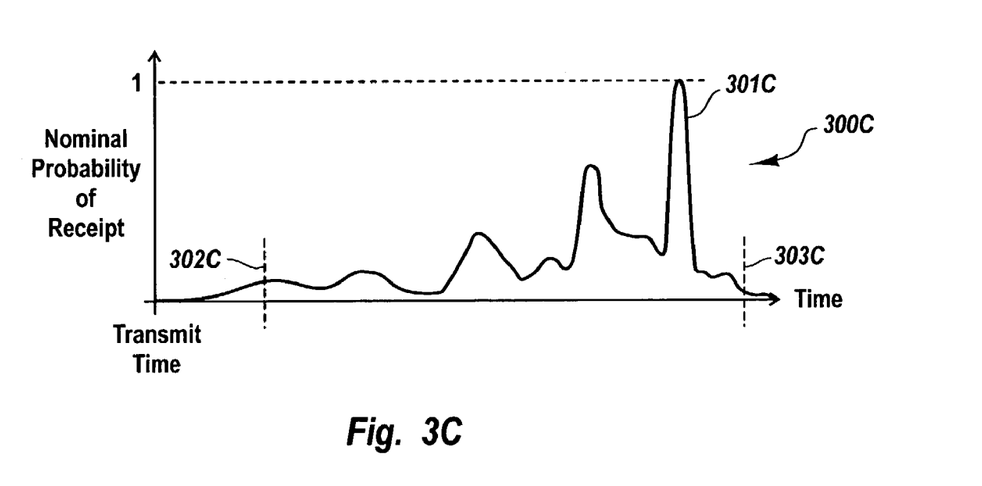

Each wireless network will have its own performance statistics in terms of how long it takes to receive a response to a message. This time is often referred to as the "round trip" time. As an illustrative example, FIGS. 3A, 3B, and 3C illustrate three different round trip statistics 300A, 300B and 300C for the three different networks 201A, 201B, 201C, respectively. The specific statistics are provided by way of illustration only and are not the result of any sort of experimentation of specific networks. The precise performance statistics are not important for the principles of the present invention. The principles of the present invention will operate to reduce power consumption with wireless networks for any round trip performance statistics.

Each of FIGS. 3A through 3C plots the probability of receipt (with the maximum probability nominalized to a value of one) against time. For example, in Figure 3A, curve 301A represents the nominal probability versus time for round trip times in wireless network 201A. Note that there is a certain window of time between time 302A and 303A that a response to the request is likely to be received. The curve appears somewhat Gaussian although wireless networks often do not exhibit round trip times with Gaussian distributions since non-random factors often play a role in round trip times.

FIG. 3B illustrates a curve 301B that represents the nominal probability versus time for round trip times in wireless network 201B. There is also a certain window of time between time 302B and 303B that a response to the request is likely to be received. Accordingly, the wireless network 201B appears to be slower at returning a response than the wireless network 201A.

FIG. 3C illustrates a curve 301C that represents the nominal probability versus time for round trip times in wireless network 201C. The window of time in which a response to a message is likely to be received is very large in this wireless network. For example, a window of time between 302C and 303C represents a window of time in which the response is likely to be received. Note here how the probability distribution may not be consistently describable by any particular set of mathematical functions.

These round trip performance statistics may be gathered for any given wireless network by simply monitoring round trip performance over a significant period of time regardless of the actual round trip performance statistics. For example, a TCP/IP network using 802.11b may monitor how long it takes to receive a TCP acknowledgement message for a particular transmitted TCP packet. Since very little processing is required to return that acknowledgement message, the round trip times may have a narrow window as in FIGS. 3A and 3B. On the contrary, other messages may require some variable amount of processing before a response is returned. In that case, the window may be quite broad as in FIG. 3C. In each wireless network, the response to the message is not scheduled in a deterministic way and thus the round trip time is not known for certain for any given request/response pair.

The window of time in which it is likely that a response to a message may be received may be reduced by forming multiple round trip performance statistics monitored for a single wireless network. For example, some message types may have fairly typical and predictable round trip times. Those messages might be identified by, for example, reading a particular header or measuring other characteristics of the message. Those types of messages may be simply responded to, requiring little processing at all. By separating tracking of such messages from other types of messages, a narrower window may be obtained thereby resulting in reduced power consumption as will be described further below.

Figure 4:
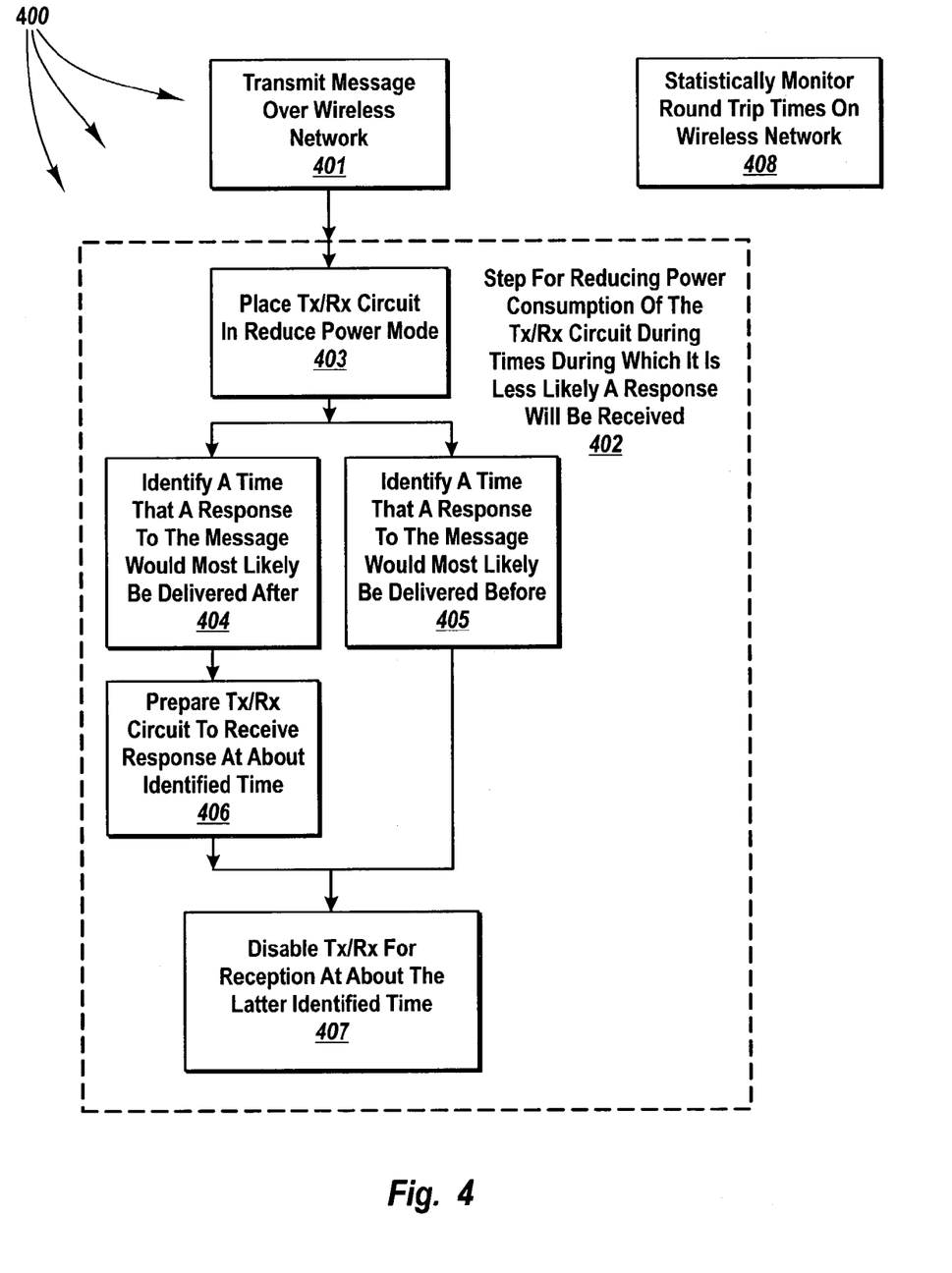
FIG. 4 illustrates a flowchart of a method for conserving transmitter/receiver power in accordance with the principles of the present invention.

FIG. 4 illustrates a flowchart of a method 400 for transmitting a message and receiving a response thereto in a power efficient manner in accordance with the principles of the present invention. First, a message is transmitted over a wireless network (act 401) using a transmitter/receiver circuit (also referred to as a "Tx/Rx circuit" or simply "Tx/Rx"). For example, wireless device 100 may transmit a message over the wireless network 201A using transmitter/receiver circuit 118.

The method then includes a functional, result-oriented step for reducing power consumption of the transmitter/receiver circuit by reducing usage of the transmitter/receiver circuit during times during which it is less likely that a response to the message will be received (step 402). This functional, result-oriented step may include any corresponding acts for accomplishing this result. However, in the illustrated embodiment, the step 402 may include corresponding non-functional acts 403, 404 and 406, and optionally also corresponding non-functional acts 405 and 407.

Figure 5:
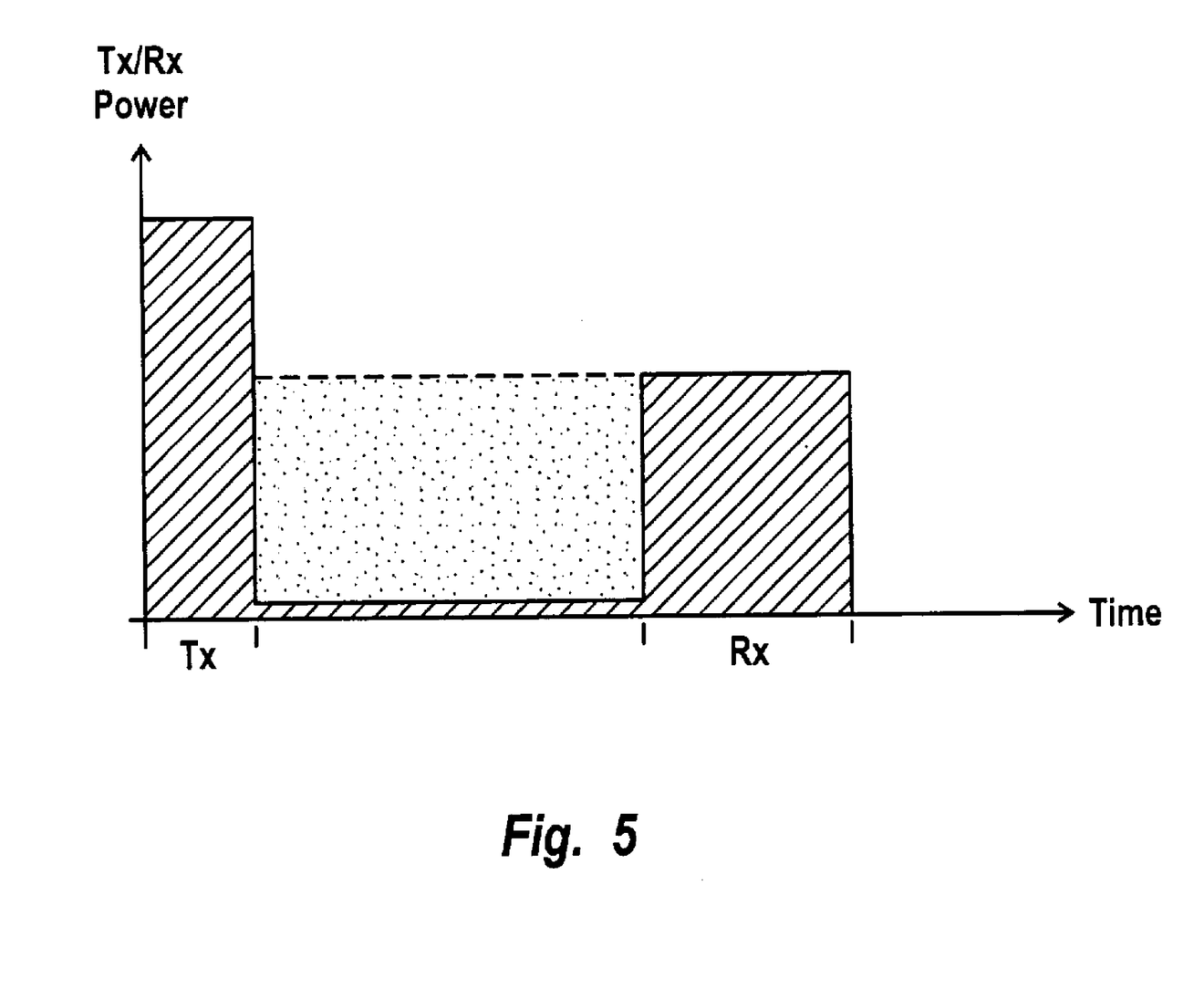
FIG. 5 shows a figurative plot of power consumption over time in accordance with the principles of the present invention.

Specifically, after transmitting the message, the transmitter/receiver circuit is placed in a reduced-power mode (act 403). This reduced-power mode is too low for the transmitter/receiver to be prepared to transmit or receive. For example, referring to FIG. 5, a certain level of power is needed to transmit as represented by the high power levels above "Tx" at lower times. As the transmission is completed, the power is reduced to a very low level as represented by the narrow cross-hatched area between the transmit and receive times.

The wireless device 100 also identifies a time that a response to the message would most likely be delivered after based on previous statistical monitoring of round trip times of the wireless network. For instance, if the network had round trip performance statistics that appear like curve 301A, the wireless device may identify time 302A; if the statistics were like curve 301B, the wireless device may identify time 302B; and if the statistics were like curve 301C, the wireless device may identify time 303B. While there may be some chance that a response to the message would be returned before that identified time, it is not likely.

The performance statistics may be gathered by the wireless device itself, but may also be monitored by another computing system (e.g., a server or access point) within the wireless network. The identified time may be expressed in terms of a relative time with respect to the transmission time. In that case, the wireless device may use that relative time and the known transmission time, to calculate an absolute time in terms of a local or network clock.

The wireless device 100 then prepares the transmitter/receiver circuit to receive a response to the message at about the identified time (act 406). For example, referring to FIG. 5, the power is increased at the beginning of the reception time labeled Rx. Now the transmitter/receiver circuit is prepared to receive a response to the message. Note in FIG. 5 that by turning the power low (or off) during the time between the transmission and the estimated identified time, power is conserved as compared to keeping the receiver prepared to receive at all times after transmission. Particularly, the energy represented by the dotted rectangle is conserved.

The receive may remain on, but better energy conservation may be obtained by turning the transmitter/receiver off at some point. The turn off time may be a predetermined time or may also be determined based on round trip performance statistics. For instance, the step 402 may include a corresponding act of identifying a time that a response to the message would most likely be delivery before based on previous statistical monitoring of round trip times of the wireless network (act 405). In that case, the transmitter/receiver circuit would remain prepared to receive during the window between the two identified times. For example, in FIGS. 3A, 3B and 3C, the identified time that a response to the message would most likely be received before is represented by time 303A, 303B and 303C, respectively. The transmitter/receiver circuit would then once again return to a reduced-power mode (act 407). Alternatively, the transmitter/receiver circuit may be turned off once it detects that a response is received even if the identified times 303 has not yet been reached.

The principles of the present invention allow for reduced power consumption due to the reduced power state of the transmitter/receiver between transmission and receiving times. However, if the window of time is too narrow, the identified time after which a response to the message is likely to be received is too late, and/or the identified time before which a response to the message is likely to be received is too soon, there may be too many instances in which a response to the message is not received. This is because the transmitter/receiver may too often not be in a higher power state sufficient to receive at the time the response is received.

Accordingly, the window or identified times may differ depending on the circumstances. For example, a broader window may be appropriate if the message is particularly important or is a particular type of message. The broadening of the window will make it less likely that a response to the message will be missed. The importance of the message may be determined by reading the importance or information from which the importance of the message may be inferred from a field within the message itself and/or from information that is external to the message.

In addition, the window or identified times may differ depending on the sensitivity of the network to not receiving a response to the message. Networks that are more sensitive to loss of such a response may have a broader window, while those that are not may have a narrower window. Accordingly, the principles of the present invention allow for reduced power consumption while allowing for the importance of the message and nature of the wireless network to be considered in order to allow sufficient reliability in receiving responses the message. Due to this power savings, battery life for a wireless network may be extended for a given battery. Accordingly, the convenience of using the wireless device is improved since recharging and/or replacing of the battery is made less frequent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a computing system that includes a transmitter/receiver circuit for communication over a wireless network, a method for transmitting a message and receiving a response thereto in a power efficient manner, the method comprising the following:
   an act of transmitting the message over the wireless network using the transmitter/receiver circuit;
   an act of placing the transmitter/receiver circuit in a reduced power mode after transmitting the message, the reduced power mode allowing the transmitter/receiver circuit to consume less power than when the transmitter/receiver circuit is prepared to transmit or receive;
   an act of identifying a time that a response to the message would most likely be delivered after based on previous statistical monitoring of round trip times of the wireless network; and
   an act of preparing the transmitter/receiver circuit to receive a response to the message at about the identified time, wherein the transmitter/receiver circuit is prepared before the response is delivered.

2. A method in accordance with claim 1, wherein the message is a packet.

3. A method in accordance with claim 2, wherein the response to the message is an acknowledgment of receipt of the packet.

4. A method in accordance with claim 3, wherein the wireless network is any 802.11 wireless network.

5. A method in accordance with claim 3, wherein the wireless network is a Bluetooth wireless network.

6. A method in accordance with claim 3, wherein the wireless network is a wireless carrier network.

7. A method in accordance with claim 3, wherein the wireless network is a cell within a wireless carrier network.

8. A method in accordance with claim 1, wherein the response to the message is an acknowledgement of receipt of the message.

9. A method in accordance with claim 1, wherein the wireless network is an 802.11b wireless network.

10. A method in accordance with claim 1, wherein the wireless network is a Bluetooth wireless network.

11. A method in accordance with claim 1, wherein the wireless network is a wireless carrier network.

12. A method in accordance with claim 1, wherein the wireless network is a cell within a wireless carrier network.

13. A method in accordance with claim 1, further comprising the following:
   an act of the computing system itself statistically monitoring the round trip times.

14. A method in accordance with claim 1, further comprising the following:
   an act of the computing system acquiring statistical data resulting from statistical monitoring of round trips times of the wireless network, wherein the act of identifying a time that a response to the message would most likely be delivered after is performed using the statistical data.

15. A method in accordance with claim 1, wherein the act of identifying a time comprises the following:
   an act of the computing system acquiring the time from another computing system.

16. A method in accordance with claim 15, wherein the act of identifying a time comprises the following:
   an act of identifying the time as measured by a timer of the computing system.

17. A method in accordance with claim 1, further comprising the following:
   an act of identifying the sensitivity of the wireless network to not receiving the response; and
   an act of adjusting the time based on the sensitivity of the wireless network, such that a higher sensitivity is associated with an earlier identified time.

18. A method in accordance with claim 1, further comprising the following:
   an act of identifying that the computing system is on the wireless network, wherein the acts of transmitting, placing, identifying, and preparing may be performed for a plurality of different wireless networks with different statistical round trip times.

19. A method in accordance with claim 18, further comprising the following:
   an act of identifying a time that a response to the message would most likely be delivery before based on previous statistical monitoring of round trip times of the wireless network, wherein the act of preparing the transmitter/receiver circuit to receive a response to the message comprises the following:
an act of preparing the transmitter/receiver circuit to receive a response to the message during a window of time beginning at the identified time that a response to the message would most likely be delivered after until the identified time that a response to the message would most likely be delivered before.

20. A method in accordance with claim 1, wherein the reduced power mode is an off mode.

21. A method in accordance with claim 1, wherein the act of preparing the transmitter/receiver circuit to receive a response to the message comprises:
based on the previous statistical monitoring, an act of determining a window of time during which the response to the message would most likely be delivered.

22. In a computing system that includes a transmitter/receiver circuit for communication over a wireless network, a method for transmitting a message and receiving a response thereto in a power efficient manner, the method comprising the following:
an act of transmitting the message over the wireless network using the transmitter/receiver circuit;
an act of placing the transmitter/receiver circuit in a reduced power mode after transmitting the message, the reduced power mode allowing the transmitter/receiver circuit to consume less power than when the transmitter/receiver circuit is prepared to transmit or receive;
an act of identifying a time that a response to the message would most likely be delivered after based on previous statistical monitoring of round trip times of the wireless network;
an act of preparing the transmitter/receiver circuit to receive a response to the message about the identified time;
an act of identifying an importance of the information contained in the message; and
an act of adjusting the time based on the importance of the information so that more important information is associated with an earlier identified time.

23. A method in accordance with claim 22, wherein the act of identifying an importance of the information contained in the message comprises the following:
an act of reading information that represents the importance of from which the importance of the message may be inferred from a field within the message itself.

24. A method in accordance with claim 22, wherein the act of identifying an important of the information contained in the message comprises the following:
an act of reading information that represents the importance of from which the importance of the message may be inferred from information that is external to the message itself.

25. A method in accordance with claim 22, wherein the act of identifying an importance of the information contained in the message comprises the following:
an act of inferring the importance based on a combination of information read from the message itself as well as information that is external to the message.

26. A computer program product for use in a computing system that includes a transmitter/receiver circuit for communication over a wireless network, the computer program product for implementing a method for transmitting a message and receiving a response thereto in a power efficient manner, the computer program product comprising one or more computer-readable media having thereon the following:
computer-executable instructions for causing the message to be transmitted over the wireless network using the transmitter/receiver circuit;
computer-executable instructions for placing the transmitter/receiver circuit in a reduced power mode after transmitting the message, the reduced power mode allowing the transmitter/receiver circuit to consume less power than when the transmitter/receiver circuit is prepared to transmit or receive;
computer-executable instructions for identifying a time that a response to the message would most likely be delivered after based on previous statistical monitoring of round trip times of the wireless network; and
computer-executable instructions for causing the transmitter/receiver circuit to be prepared to receive a response to the message at about the identified time, wherein the transmitter/receiver circuit is prepared before the response is delivered.

27. A computer program product in accordance with claim 26, wherein the one or more computer-readable media further have thereon the following:
computer-executable instructions for statistically monitoring the round trip times.

28. A computer program product in accordance with claim 26, further comprising the following:
computer-executable instructions for identifying an importance of the information contained in the message; and
computer-executable instructions for adjusting the time based on the importance of the information so that more important information is associated with an earlier identified time.

29. A computer program product in accordance with claim 26, further comprising the following:
computer-executable instructions for identifying that the computing system is on the wireless network, wherein the acts of transmitting, placing, identifying, and preparing may be performed for a plurality of different wireless networks with different statistical round trip times.

30. A computer program product in accordance with claim 26, further comprising the following:
computer-executable instructions for identifying a sensitivity of the wireless network to not receiving the response; and
computer-executable instructions for adjusting the time based on the sensitivity of the wireless network so that more sensitivity is associated with an earlier identified time.

31. In a computing system that includes a transmitter/receiver circuit for communication over a wireless network, a method for transmitting a message and receiving a response thereto in a power efficient manner, the method comprising the following:
an act of transmitting the message over the wireless network using the transmitter/receiver circuit; and
a step for reducing power consumption of the transmitter/receiver circuit by reducing usage of the transmitter/receiver circuit during times during which it is less likely that a response to the message will be received, wherein the step for reducing power consumption is performed before the response is delivered, and wherein the transmitter/receiver circuit is prepared before the response is delivered.

32. A method in accordance with claim 31, wherein the step for reducing power consumption of the transmitter/receiver circuit by reducing usage of the transmitter/receiver during times at which it is less likely that a response to the message would be received comprises the following:

an act of placing the transmitter/receiver circuit in a reduced power mode after transmitting the message, the reduced power mode allowing the transmitter/receiver circuit to consume less power than when the transmitter/receiver circuit is prepared to transmit or receive;

an act of identifying a time that a response to the message would most likely be delivered after based on previous statistical monitoring of round trip times of the wireless network; and an act of preparing the transmitter/receiver circuit to receive a response to the message at about the identified time.

* * * * *